United States Patent
Riggs et al.

(10) Patent No.: US 8,195,762 B2
(45) Date of Patent: Jun. 5, 2012

(54) LOCATING A PORTION OF DATA ON A COMPUTER NETWORK

(75) Inventors: Brian Riggs, San Francisco, CA (US); Darrick Brown, Redwood City, CA (US); Daniel Cooley, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 738 days.

(21) Appl. No.: 11/441,636

(22) Filed: May 25, 2006

(65) Prior Publication Data
US 2007/0276921 A1 Nov. 29, 2007

(51) Int. Cl.
*G06F 15/16* (2006.01)
(52) U.S. Cl. ......... 709/217; 709/231; 709/219; 709/207
(58) Field of Classification Search .................. 709/217
See application file for complete search history.

(56) References Cited

U.S. PATENT DOCUMENTS

| | | |
|---|---|---|
| 5,659,729 A | 8/1997 | Nielsen |
| 5,898,836 A | 4/1999 | Freivald et al. |
| 5,982,370 A | 11/1999 | Kamper |
| 6,763,496 B1 | 7/2004 | Hennings et al. |
| 6,950,987 B1 | 9/2005 | Hargraves et al. |
| 6,961,909 B2 | 11/2005 | Lord et al. |
| 2004/0205545 A1 * | 10/2004 | Bargeron et al. ............. 715/512 |
| 2005/0034063 A1 | 2/2005 | Baker et al. |
| 2005/0055458 A1 * | 3/2005 | Mohan et al. ................. 709/238 |
| 2005/0066269 A1 | 3/2005 | Wang |
| 2005/0149576 A1 * | 7/2005 | Marmaros et al. ............ 707/200 |
| 2005/0149851 A1 | 7/2005 | Mittal |
| 2005/0268214 A1 | 12/2005 | Lu |
| 2006/0026496 A1 | 2/2006 | Joshi et al. |
| 2006/0046686 A1 * | 3/2006 | Hawkins et al. ............. 455/403 |
| 2007/0208704 A1 * | 9/2007 | Ives ................................. 707/3 |

OTHER PUBLICATIONS

International Search Report and Written Opinion from PCT/US07/12488, mailed Jul. 30, 2008.
U.S. Appl. No. 11/491,069, filed Jul. 20, 2006.

* cited by examiner

*Primary Examiner* — Kenny Lin
*Assistant Examiner* — Sulaiman Nooristany
(74) *Attorney, Agent, or Firm* — Robert C. Kowert; Meyertons, Hood, Kivlin, Kowert & Goetzel, P.C.

(57) ABSTRACT

A method for locating a portion of data is provided. In this method, a request for a Uniform Resource Locator (URL) associated with data is transmitted. The request comprises a labeling tag that is associated with the data. As a result of the request, an URL that comprises an anchor identifier is received and the data located at the URL are retrieved. An anchor within the data is located based on the anchor identifier and a portion of data is located based on the location of the anchor.

22 Claims, 8 Drawing Sheets

LOCATING A PORTION OF DATA ON A COMPUTER NETWORK

FIELD OF THE INVENTION

The present invention relates generally to software and, more particularly, to locating a portion of data on a computer network.

BACKGROUND

A Uniform Resource Locator (URL) is the primary way to refer to or address data on the Internet. Examples of data include HyperText Markup Language (HTML) documents, image files, video files, and other resources. In general, an URL is a string of characters conforming to a standardized format that refers to data on the Internet by their location. For example, an URL may include the data's name (e.g., file name) preceded by a hierarchy of directory names in which the data are stored. Additionally included in an URL, for example, is the communication protocol and the Internet domain name of the server that hosts the data.

Currently, to reference a location in a document (e.g., HTML document), the URL provides an anchor identifier that points to a specific location within the document. The anchor identifier follows the server and pathname of the URL and is separated by the # number sign. A corresponding anchor is inserted into the specific location in the document. When a Web browser reads an URL with an anchor identifier, the anchor identifier indicates to the client Web browser that it should begin displaying or scrolling the document from the specified location of the anchor.

A limitation associated with the anchor is that the anchor could only point to a specific location in the document. The anchor cannot reference a particular region or portion of the document. Thus, an URL cannot be used to reference a region in the document. The anchor limitation also limits the functionalities of application programs that may need more granularity or level of detail when using URLs to point to a document.

In view of the foregoing, there is a need for continuing efforts to improve the reference capabilities of an URL.

BRIEF DESCRIPTION OF THE DRAWINGS

Various embodiments of the invention are disclosed in the following detailed description and the accompanying drawings.

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

The embodiments described herein provide methods and systems for locating and accessing a portion of data on a computer network. In general, an anchor associated with a Uniform Resource Locator (URL) (or a Uniform Resource Identifier) may be used to point to a particular portion of data. In some embodiments, a portion of data may be located based on the location of the anchor embedded in the data. The portion of data may be enclosed in a microformat that identifies the boundaries of the portion of data. As explained in more detail below, with the use of an anchor to locate a portion of data stored in a computer network, the portion of data may subsequently be accessed by referencing the labeling tags associated with the portion of data on a labeling tag server.

Figure 1:
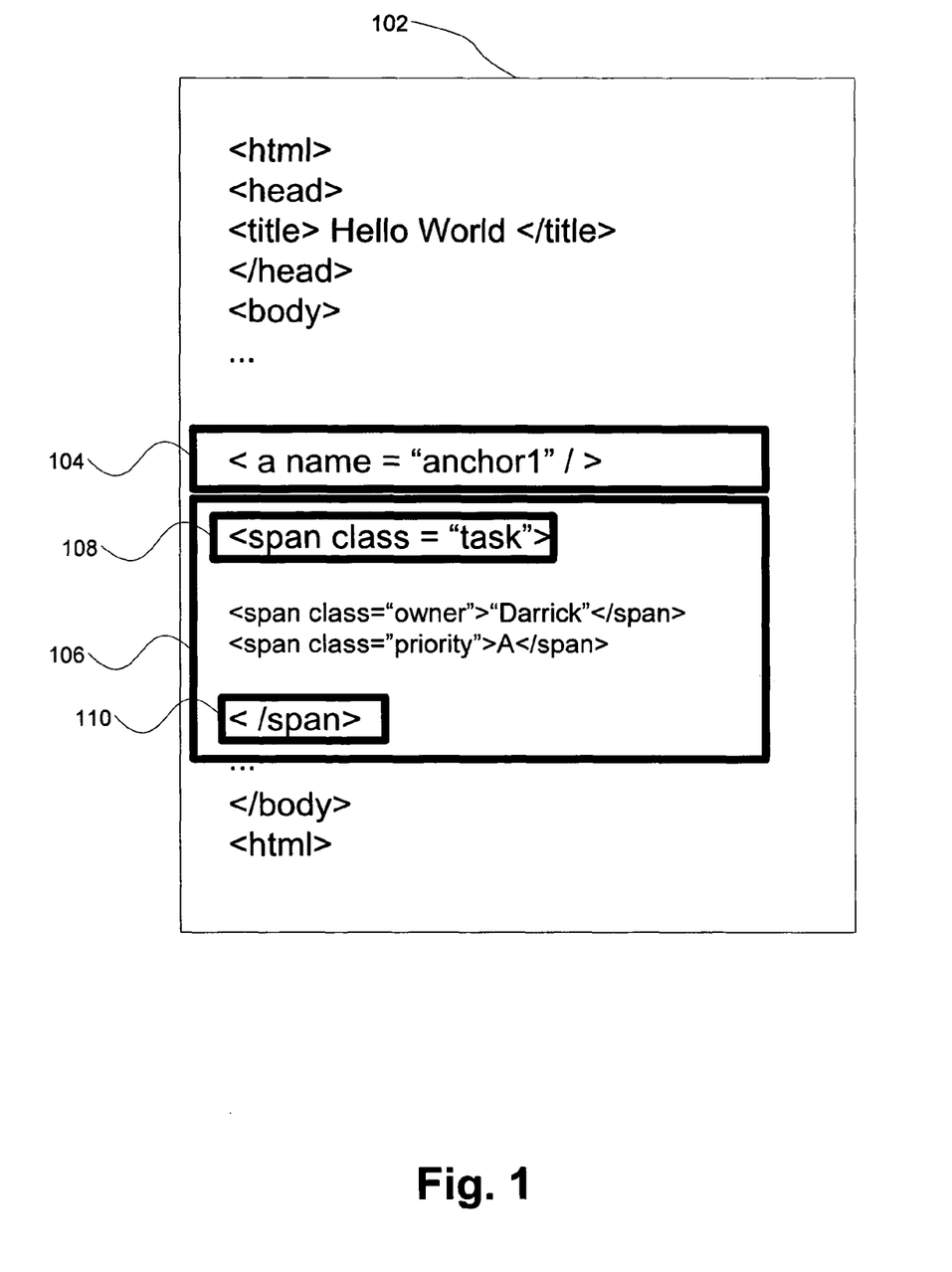
FIG. 1 is a listing of data associated with a HyperText Markup Language (HTML) document, in accordance with an embodiment.

FIG. 1 is a listing of data associated with a HyperText Markup Language (HTML) document, in accordance with an embodiment. Data associated with HTML document 102 include contents, HTML tags, and other data that define the appearance and structure of the HTML document. As shown in FIG. 1, data includes anchor 104 and portion 106 of data. A user may define portion 106 or region of data for subsequent access or retrieval. As used herein, it should be noted that the terms "portion of data" and "region of data" may be used interchangeably. Portion 106 of data may be defined by a boundary and the boundary associated with the portion of data may be embedded into the portion of data. For example, in some embodiments, portion 106 of data may be encapsulated in a microformat, which includes syntax to define the boundary of the portion of data. In general, it should be appreciated that microformats are a set of data formats built upon existing standards. For example, a microformat may be developed and based on existing Extensible HyperText Markup Language (XHTML), and the XHTML may be structured around content to identify the contents. Examples of microformats include hCard, hReview, hCalendar, XFN, rel-tag, XOXO, and other microformats. Here, microformat provides start tag 108 and end tag 110 that define the boundary of portion 106 of data. In other words, microformat may be used to identify where portion 106 starts and ends. Thus, portion 106 of data is enclosed between start tag 108 and end tag 110. It should be appreciated that start tag 108 and end tag 110 may be based on HTML tags, XML tags, and other tags.

To locate portion 106 of data with an URL, an anchor may be used. The location of portion 106 of data may be identified in an anchor identifier or based on the location of anchor 104. In general, an anchor, such as anchor 104, describes a link between two locations. An anchor therefore may be used as a pointer to a location within the data. An anchor may be represented by a variety of file formats, such as HTML, image, PDF, and other file formats. For example, an anchor may be defined as "<a name="anchor name"/>" in HTML. An URL, which is a string of alphanumeric characters that refers to data (e.g., HTML documents, graphic files, sound files, video files, and other data) on a computer network by the location of the data. The URL may include an anchor identifier. For example, the URL http://www.adobe.com/mypage.html#anchor1 includes an anchor identifier (i.e., a source anchor) that defines the name of the anchor as "anchor1." The anchor identifier is separated from the rest of the URL by the # number sign. The anchor identifier "anchor1" points to anchor 104 (i.e., a target anchor) located in data associated with HTML document 102.

In an embodiment, the location of portion 106 of data may be located based on location of anchor 104. Conversely, the location of anchor 104 may be used to locate portion 106 of data. For example, as shown in FIG. 1, portion 106 of data is located after the location of anchor 104. Thus, the location of portion 106 of data may be located relative to the location of anchor 104. In addition to being located after anchor 104, portion 106 of data may be located before the anchor, a number of lines after the anchor, a number of spaces before the anchor, or at a variety of locations relative to the location of the anchor. In another embodiment, the anchor identifier or anchor 104 may include information that identify the location of portion 106 of data. For example, the anchor identifier may identify the line numbers associated with portion 106 of data. With video data, for example, the anchor identifier may identify the time and/or frame numbers associated with a portion of video data. Here, the data may not include an anchor, such as anchor 104, because portion 106 of data may be located based on information included in the anchor identifier, which identify the location of the portion of data.

FIG. 1 shows that portion 106 of data is encapsulated in a microformat. To encapsulate portion 106 of data in a microformat, for example, a user may select the portion of data associated with HTML document 102 and enter a description associated with the portion of data. Start tag 108 and end tag 110 are then created based on the description and the start tag and the end tag are inserted into portion 106 of data to define the boundaries of the portion of data. Further, in an embodiment, to locate portion 106 of data with an URL, anchor 104 may be inserted into the data. The location of anchor 104 is based on the location of portion 106 of data. In another embodiment, the anchor identifier may include information to locate portion 106 of data.

Figure 2:
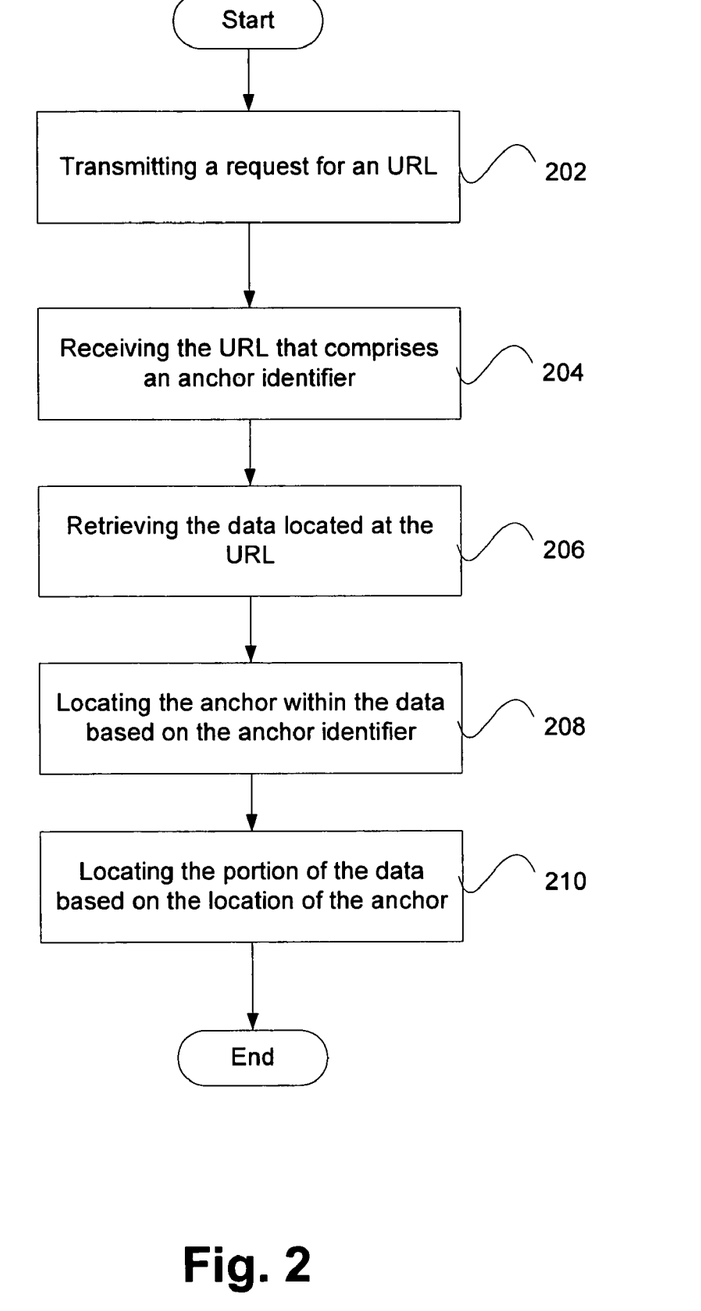
FIG. 2 is a flowchart diagram of a high level overview for locating a portion of data based on an URL, in accordance with an embodiment.

FIG. 2 is a flowchart diagram of a high level overview for locating a portion of data based on an URL, in accordance with an embodiment. As shown in FIG. 2, to locate a portion of data on the computer network, a request for one or more URLs is transmitted to a labeling tag server in operation 202. The request includes labeling tags that are associated with the data. A labeling tag is a string of alphanumeric text that is associated with data. For example, a news website with URL "http://www.news.com" may be tagged with the labeling tag "news." As will be explained in more detail below, a labeling tag server may represent the tagging by associating the URL "http://www.news.com" with the labeling tag "news."

In response to the request, the labeling tag server transmits one or more URLs associated with the labeling tag, and each URL includes an anchor identifier. The labeling tag server is a server that stores labeling tags, URLs, and relationships between labeling tags and URLs. The URL with the anchor identifier is received from the labeling tag server in operation 204 and the data located at the URL is retrieved in operation 206. The data may be retrieved from a variety of sources, such as Web servers, blog servers, file transfer protocol (FTP) servers, email servers, and other servers. Data may include a resource on the Internet, such as a Web page, a document (e.g., HTML documents, Portable Document Format (PDF) documents, Extensible Markup Language (XML) documents, and other documents), an image file, a sound file, a video file, and other resources. In the embodiment of FIG. 2, since the location of portion of data is located relative to the location of anchor, the data are embedded with or include an anchor. As explained in more detail below, in another embodiment, the data may not include an anchor.

After the data are retrieved, the anchor is located within the data in operation 208 based on the anchor identifier. The anchor may be located by matching a name identified in the anchor with a name identified in the anchor identifier. Thereafter, as shown in operation 210, the portion of data may be located based on the location of the anchor. In other words, the portion of data may be located relative to the location of the anchor. For example, as discussed above, the portion of data may be located after the anchor. In another example, the portion of data may be located before the anchor. In still another example, the data may surround the anchor, whereby the anchor is located between where the portion of data starts and ends.

Figure 3:
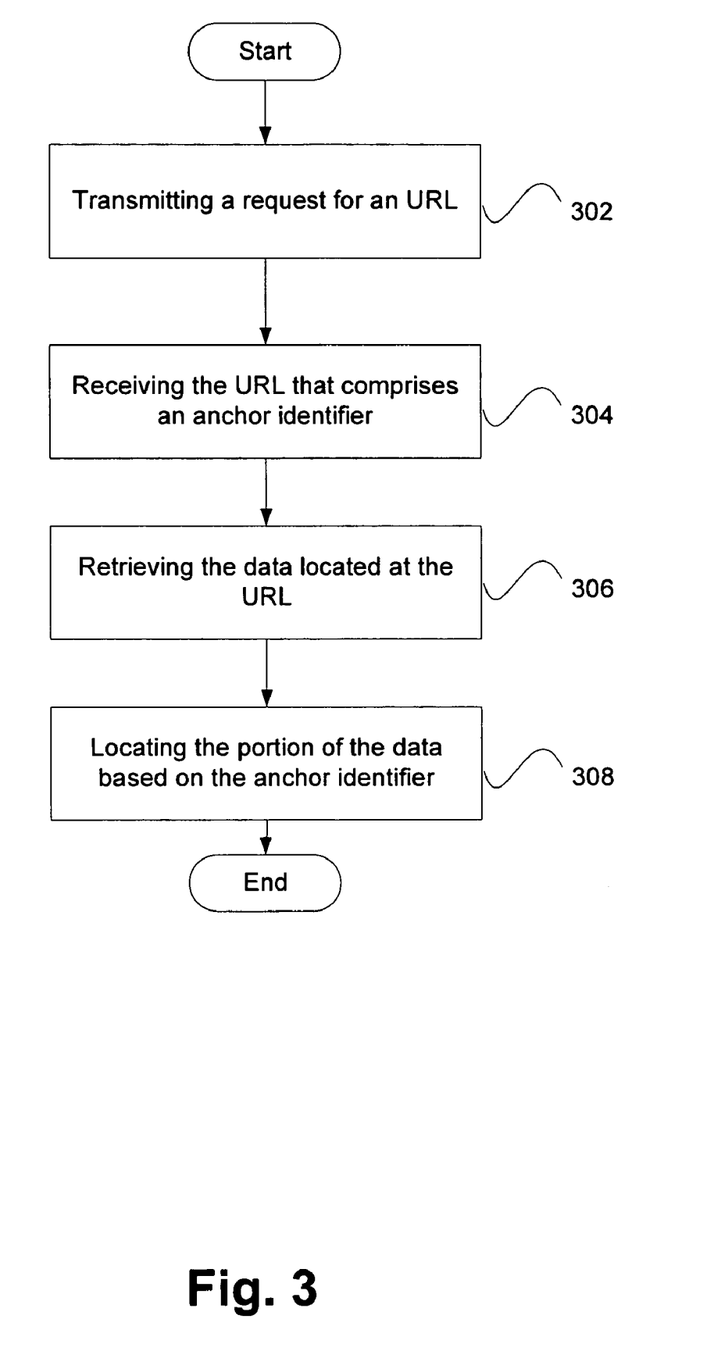
FIG. 3 is a flowchart diagram of a high level overview for locating a portion of data based on an URL, in accordance with another embodiment.

FIG. 3 is a flowchart diagram of a high level overview for locating a portion of data based on an URL, in accordance with another embodiment. As shown in FIG. 3, a request for an URL is transmitted to a labeling tag server in operation 302 to locate data on a computer network. The request includes a labeling tag associated with the data. In response to the request, the labeling tag server transmits one or more URLs associated with the labeling tag. Here, an URL with an anchor identifier is received from the labeling tag server in operation 304 and the data located at the URL is retrieved in operation 306.

In this embodiment, the anchor identifier includes information for locating the portion of data and, as a result, the portion of data may be located in operation 308 based on the anchor identifier. For example, the name of the anchor identifier may include information for locating the portion of data. An example of an anchor identifier is "#03;42;24-07;23;06." The name of the anchor "03;42;24-07;23;06" is identified by the alphanumeric characters after the # number sign. In this example, the alphanumeric characters define a range within a portion of video data. The format associated with the anchor identifier defines the start minutes, seconds, and frame numbers, followed by the end of the video clip in minutes, seconds, and frame numbers. Since the anchor identifier includes information for locating the portion of data, the data may not include an anchor associated with the anchor identifier. In other words, the portion of data is not located relative to the location of the anchor and therefore, the data may not include an anchor. For example, a region of image may be located by including pixel coordinates in the anchor identifier. The anchor identifier may, for example, be "#150-600;100-800," which defines a region of an image having upper-right coordinates of X=100, Y=800 and lower-left coordinates X=150, Y=600.

Figure 4:
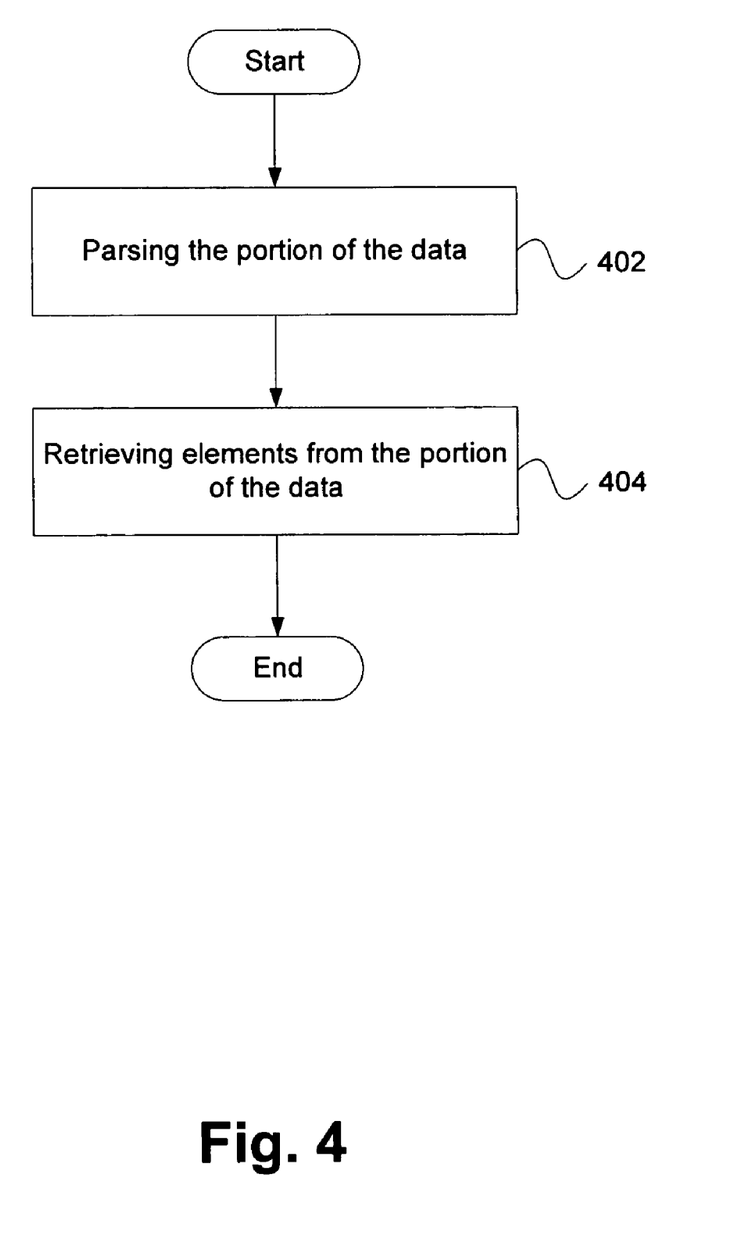
FIG. 4 is a flowchart diagram of a high level overview for processing a portion of data after the portion is located, in accordance with an embodiment.

FIG. 4 is a flowchart diagram of a high level overview for processing a portion of data after the portion is located, in accordance with an embodiment. After the portion of data is located, the portion of data may be parsed in operation 402. Examples of parsing operations include extraction and transformation. Extraction may include text extraction, link extraction, resource extraction, and other extraction operations. Examples of transformation operations include conversion to Extensible Markup Language (XML), HTML cleanup, and other transformation operations. Another example of a parsing operation is to search for an element of data, in accordance with an embodiment. To search for the element, each element associated with the portion of data is compared with the requested element. The requested element is found if one or more element patterns in portion of data match the pattern associated with the requested element. For example, in a parsing operation, HTML tags within the portion of data are extracted, and each of the extracted HTML tags is compared with a requested HTML tag to search for the requested HTML tag within the portion of data. With video data, parsing may include fast-forwarding to an initial cue point in the anchor (and stopping at the end point in the anchor), or transforming the video data such as to remove the portions that precede the initial cue point and portions that follow an end point.

It should be noted that the portion of data may be parsed from the start of the portion to the end of the portion. As discussed above, a boundary may be embedded into the portion of data such that parsing operation 402 may be confined to the portion of data. For example, the portion of data may be encapsulated in microformat. As discussed above, a microformat based on HTML can include a start tag and an end tag that define the boundary of the portion of data. With the boundaries defined, parsing operation 402 may parse every element of data between the start tag and the end tag. After the requested elements are found within the portion of data, the elements are retrieved from the portion of data in operation 404. In another embodiment, instead of retrieving elements of data, the entire portion of data may be retrieved.

Figure 5:
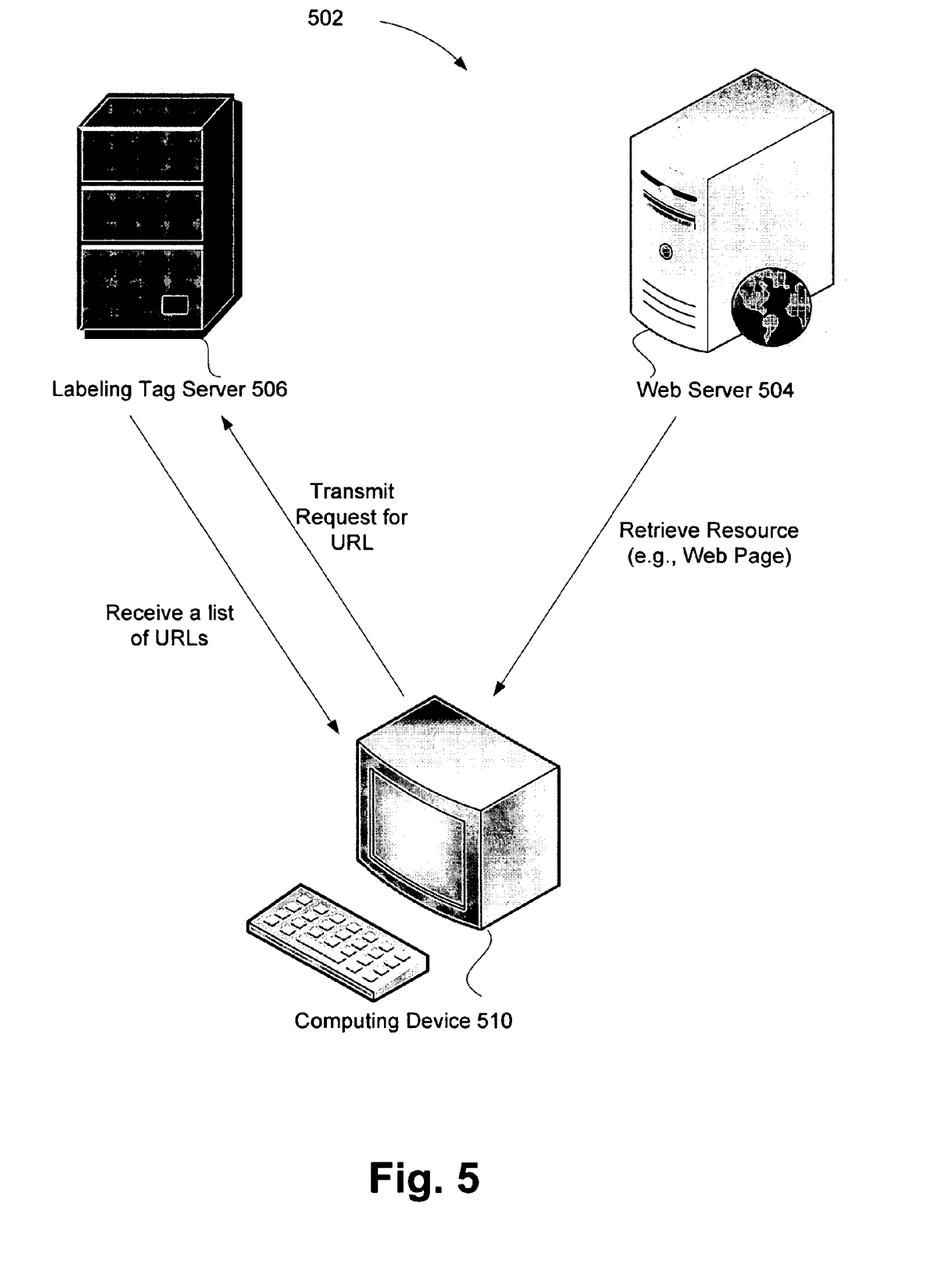
FIG. 5 is a diagram of a system for locating and accessing data stored on a computer network, in accordance with an embodiment.

FIG. 5 is a diagram of a system for locating and accessing data stored on a computer network, in accordance with an embodiment. As shown in FIG. 5, system 502 includes computing device 510, labeling tag server 506, and Web server 504. Computing device 510, labeling tag server 506, and Web server 504 may be in communication by way of a computer network, which can include local area network (LAN), Internet, and direct connections. Labeling tag server 506 is a server that stores labeling tags, URLs, and relationships between labeling tags and URLs. For example, a user may store URLs to Web pages on labeling tag server 506 to share the URLs with other users. Additionally, a user may tag each of their URLs with keywords, and the labeling tags, along with the labeling tags' association with the URLs, may be stored on labeling tag server 506. Additionally included in system 502 is Web server 504, which is a server configured for accepting HTTP requests from clients, such as computing device 510, and serving the clients with a resource, such as Web pages.

To access data stored in a portion of a resource (e.g., a Web page), computing device 510 (or an application executed on the computing device) transmits a request to labeling tag server 506 for an URL associated with the Web page. The request transmitted to labeling tag server 506 includes one or more labeling tags that are associated with the data. In response to the request, labeling tag server 506 locates one or more URLs associated with the labeling tags and transmits a list of the URLs to computing device 510. As discussed above, each URL includes an anchor identifier that identifies the location of data stored in a portion of the Web page. Computing device 5 10 receives the list of URLs from labeling tag server 506 and thereafter retrieves the Web pages from Web server 504 located at each URL.

In an embodiment, with one Web page, computing device 510 locates the data stored within a portion of the Web page (i.e., portion of data) based on the location of an anchor. In another embodiment, computing device 510 may locate the data based on information provided in the anchor identifier. With the portion of data located, computing device 510 may parse the portion of data to search for one or more elements of data. If the elements are found, the elements are retrieved from the portion of data. Thus, in view of FIG. 5, a user may store data in Web pages and can later access the data by referencing the labeling tags associated with the data by way of labeling tag server 506.

Figure 6:
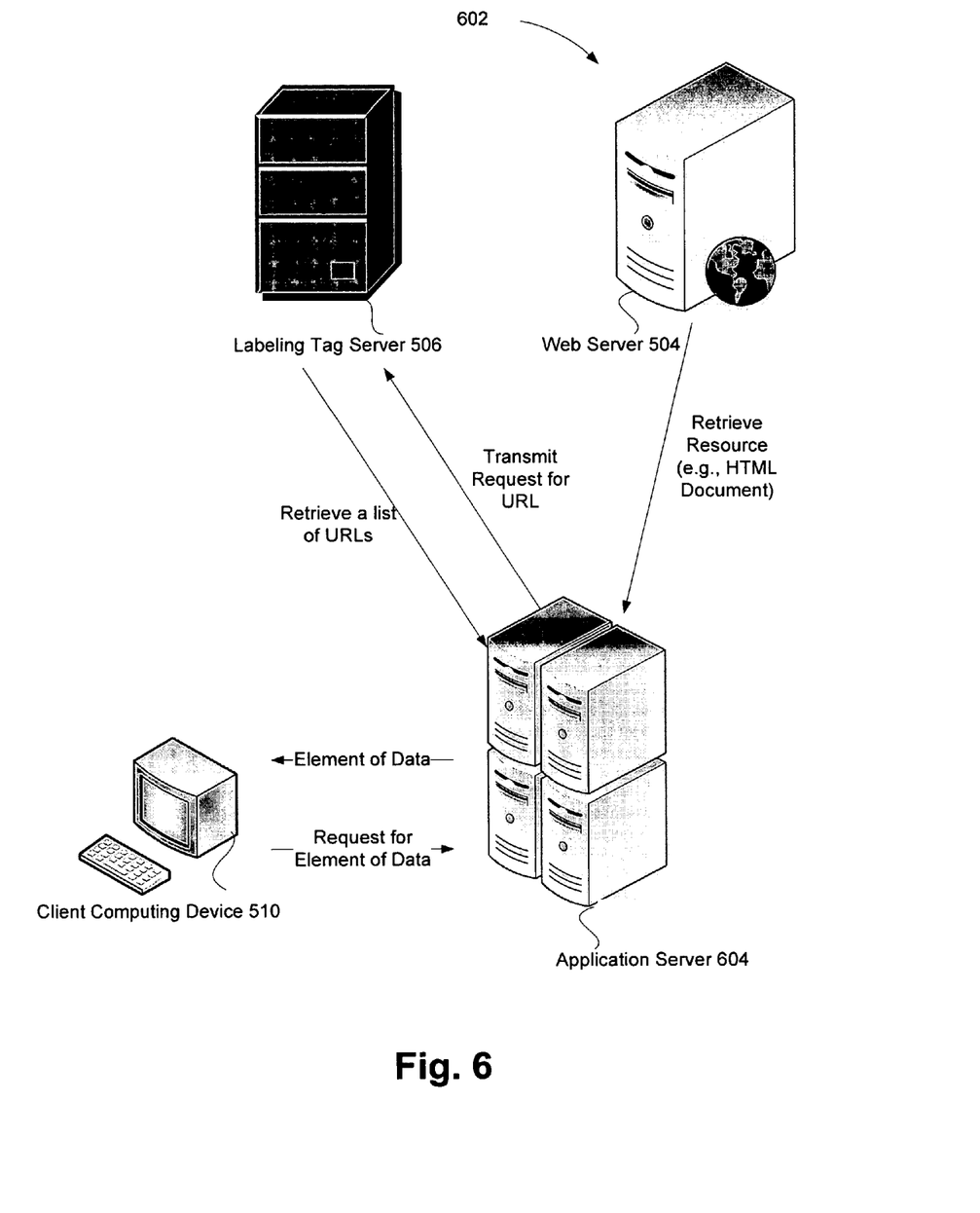
FIG. 6 is a diagram of another system for locating and accessing data stored on a computer network, in accordance with an embodiment.

FIG. 6 is a diagram of another system for locating and accessing data stored on a computer network, in accordance with an embodiment. As shown in FIG. 6, system 602 includes labeling tag server 506, Web server 504, application server 604, and client computing device 510. Client computing device 510, labeling tag server 506, application server 604, and Web server 504 may be in communication by way of a computer network. Here, a server application, such as a personal information management application, is hosted on application server 604 and the server application is accessible at client computing device 510 by way of a client application or a Web browser executed at the client computing device. For example, application server 604 may host the personal information management application and client computing device 510 (or client application) can interface with and access the personal information management application though a computer network.

In an illustrative example of system 602 locating and accessing data, a user may store data associated with a task (e.g., task name, owner of the task, and other data) in a portion of an HTML document. The data associated with the task are encapsulated in microformat with an anchor, and the HTML document is stored on Web server 504. Application server 604 hosts the personal information management application and client computing device 510 may interface with and access the personal information management application with a client application executed on the client computing device that is associated with the personal information management application.

In the example of FIG. 6, client computing device 510 (or client application) transmits a request for an element of data associated with the task, such as the owner of the task, in the form of one or more labeling tags. Application server 604 (or personal information management application) receives the request for the owner of the task and transmits a request to labeling tag server 506 for URLs to HTML documents with data associated with the task. The request transmitted to labeling tag server 506 includes a labeling tag. For instance, the labeling tag may include "task" that indicates the requested elements (e.g., owner of the task) are associated with a task. In response to the request for the URLs, labeling tag server 506 locates one or more URLs associated with tag "task" and transmits a list of the URLs to application server 604. In turn, application server 604 retrieves the HTML document from Web server 504 located at the URLs.

In an embodiment, with one HTML document, application server 604 locates the data stored in a portion of the HTML document (i.e. a portion of data) associated with the task, which is formatted in a microformat, based on the location of the anchor. In another embodiment, application server 604 may locate the portion of data associated with the task based on information provided in the anchor identifier. With the portion of data associated with the task located, application server 604 may parse the portion of data to search for one or more elements of data associated with the owner of the task. In this example, the element associated with the owner of the task is "Brian." Application server 604 retrieves the element "Brian" from the portion of HTML document and transmits the element "Brian" to client computing device 510 in response to the request for the owner of the task.

Figure 7:
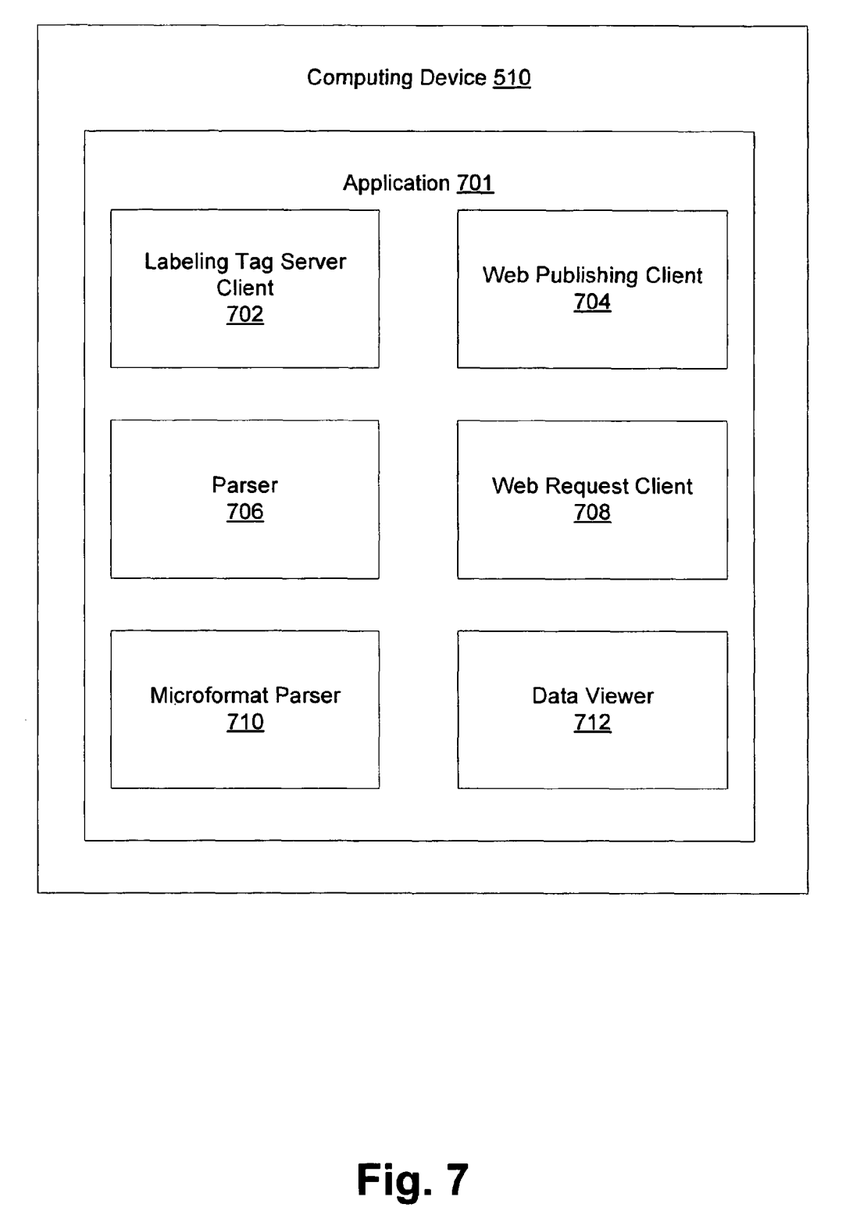
FIG. 7 is a simplified block diagram of an exemplary application for locating and processing a portion of data, in accordance with an embodiment.

FIG. 7 is a simplified block diagram of an exemplary application for locating and accessing a portion of data, in accordance with an embodiment. As shown in FIG. 7, application 701 may be hosted on computing device 510. Application 701 for locating and processing portion of data described above may include labeling tag server client 702, Web publishing client 704, parser 706, Web request client 708, microformat parser 710, and data viewer 712. Web publishing client 704 is configured to transmit or publish the data to a data source. For example, a user may use an application to associate a task to an element of data, such as "Brian," by highlighting the task and then typing "Brian" into a text field. As a result, microformat parser 710, which is described below, generates an anchor and embeds the anchor and a microformat into the data. Web publishing client 704 may then be used to publish the data to a data source.

Labeling tag server client 702 is configured to communicate with and access a labeling tag server. For example, application 701 may use labeling tag server client 702 to transmit a request for URLs to a labeling tag server and receive the URLs from the labeling tag server. Web request client 708 is configured to retrieve data from a computer network located at the URLs.

Parser 706 may be configured to locate portion of data based on location of anchor or based on the anchor identifier included in an URL. When the portion of data is located, application 701 may use microformat parser 710 to parse the portion of data. After parsing, application 701 may retrieve elements of data and may use data viewer 712 to display the elements of data such that the elements are highlighted and/or contextualized. It should be further appreciated that in other embodiments, application 701 may include fewer or more modules apart from those shown in FIG. 7. For example, in another embodiment, application 701 can include labeling tag server client 702, parser 706, microformat parser 710, Web request client 708, and data viewer 712, but not Web publishing client 704.

Figure 8:
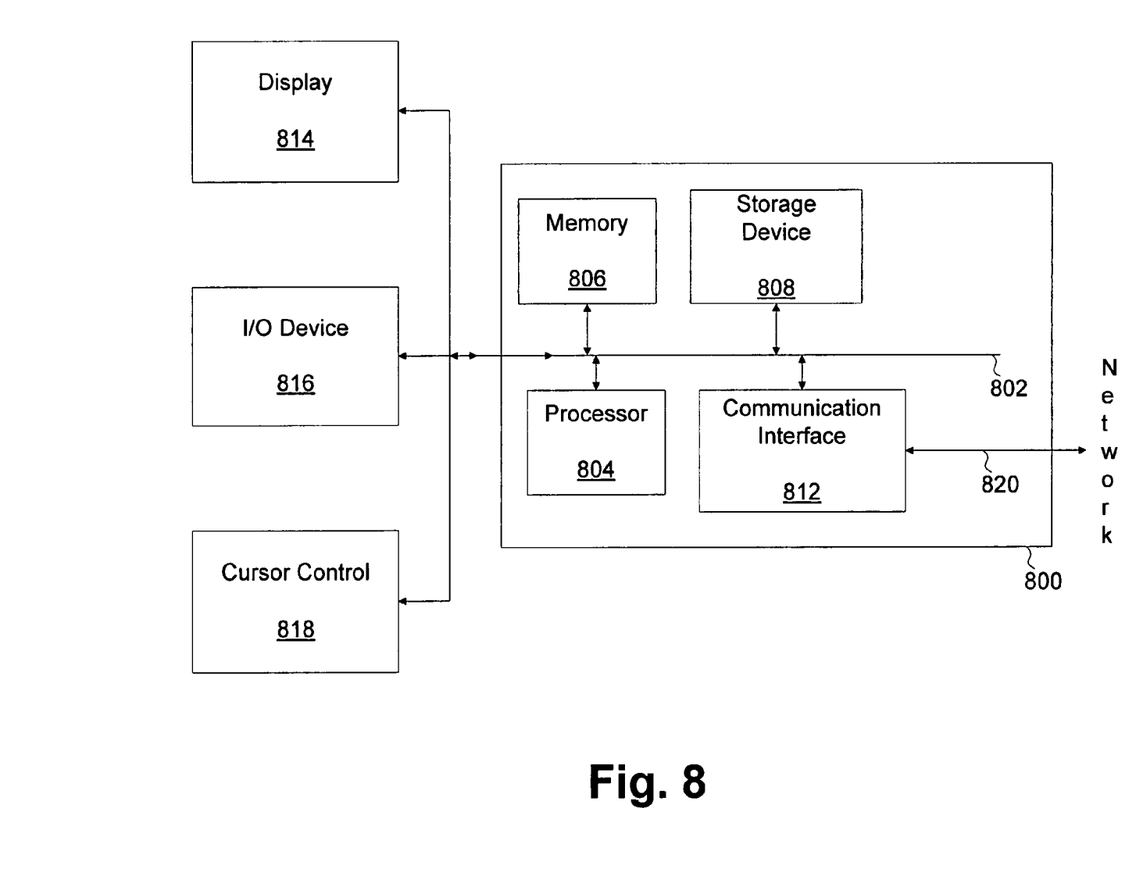
FIG. 8 is a simplified block diagram of an exemplary computing device that is suitable for processing and executing an application configured to locate and access a portion of data, in accordance with an embodiment.

FIG. 8 is a simplified block diagram of an exemplary computing device that is suitable for processing and executing an application configured to locate and access a portion of data, in accordance with an embodiment. In some embodiments, computing device 800 may be used to implement computer programs (e.g., application of FIG. 7 and client application and server application of FIG. 6), logic, applications, methods, processes, or other software to located and access portions of data. Exemplary computing device 800 includes a desktop computer, a server, a portable computing device, a personal digital assistant, a computational engine within an appliance, and other computer systems. As shown in FIG. 8, computing device 800 includes bus 802 or other communication mechanism for communicating information, which interconnects subsystems and devices, such as processor 804, system memory 806 (e.g., random access memory (RAM)), storage device 808 (e.g., read only memory (ROM), magnetic disk drives, optical disk drives, and other storage devices), communication interface 812 (e.g., modem or Ethernet card), display 814 (e.g., cathode ray tube (CRT) or liquid crystal display (LCD)), input/output device 816 (e.g., keyboard), and cursor control 818 (e.g., mouse or trackball).

In some embodiments, computing device 800 performs specific operations by processor 804 when executing one or more sequences of one or more program instructions stored in system memory 806. Such program instructions may be read into system memory 806 from another computer readable medium, such as storage device 808. In some embodiments, hard-wired circuitry may be used in place of or in combination with software program instructions to implement embodiments of the invention.

It should be appreciated that the term "computer readable medium" refers to suitable medium that participates in providing program instructions to processor 804 for execution. Such a medium may take many forms, including but not limited to, non-volatile media, volatile media, and transmission media. Non-volatile media may include, for example, optical or magnetic disks, such as storage device 808. Volatile media may include dynamic memory, such as system memory 806. Transmission media includes coaxial cables, copper wire, and fiber optics, including wires that comprise bus 802. Transmission media can also take the form of acoustic or light waves, such as those generated during radio wave and infrared data communications. Common forms of computer readable media includes, for example, magnetic mediums (e.g., floppy disk, flexible disk, hard disk, magnetic tape, and other magnetic mediums), optical mediums (e.g., compact disc read-only memory (CD-ROM) and other optical mediums), physical medium with patterns (e.g., punch cards, paper tape, any other physical mediums), memory chips or cartridges, carrier waves, (e.g., RAM, programmable read-only memory (PROM), erasable programmable read-only memory (EPROM), flash memory, and other memory chips or cartridges), and any other medium from which a computer can read.

In some embodiments, execution of the sequences of program instructions to practice the embodiments may be performed by a single computing device 800. In other embodiments, two or more computer systems, such as computing device 800, coupled by communication link 820 (e.g., local area network (LAN), public switched telephone network (PSTN), wireless network, and other communication links) may perform the sequence of program instructions to practice the embodiments in coordination with one another. In addition, computing device 800 may transmit and receive messages, data, and instructions, including program, i.e., application code, through communication link 820 and communication interface 812. Received program instructions may be executed by processor 804 as the program instructions are received, and/or stored in storage device 808, or other non-volatile storage for later execution.

The above described embodiments provide methods and systems for locating and accessing a portion of data stored on a computer network. By using an anchor to point to a location of a portion of data, an application may use the URL to locate a portion of data. As a result, for example, data may be stored on the Internet, and the data subsequently may be accessed by referencing the labeling tags associated with the data on a labeling tag server. Thus, a system that is configured to track and access Web pages, which may include labeling tag servers, Web servers, and other servers, may be configured to track and access portions of data located on the Internet. The labeling tag server in combination with, for example, a Web server, therefore may be used as a database where the Web server stores the portion of data and the labeling tag server is used to reference to or link to the portion of data.

Although the foregoing examples have been described in some detail for purposes of clarity of understanding, the embodiments are not limited to the details provided. There are many alternative ways of implementing the embodiments. The disclosed examples are illustrative and not restrictive.

What is claimed is:

1. A method, comprising:

transmitting a request to obtain a Uniform Resource Locator (URL) associated with a plurality of data, the request comprising a labeling tag;

in response to said transmitting the request, receiving the URL, wherein the URL comprises an anchor identifier that is separated from a remainder of the URL by a delimiter, and wherein the anchor identifier is usable to point to an anchor definition that is located in the plurality of data, the pointed to anchor definition having a name that matches the anchor identifier; and in response to said receiving the URL:

retrieving the plurality of data located at the URL;

determining the anchor identifier from the URL based on the delimiter; and using the determined anchor identifier to locate the anchor definition embedded at a position within the plurality of data, wherein the name of the anchor definition matches the anchor identifier;

using the position of the anchor definition to locate a portion of the plurality of data associated with the labeling tag, wherein the portion is separate from the anchor definition and enclosed in a microformat that identifies boundaries of the portion of data as having a beginning and end within the plurality of data and excludes some of the plurality of data;

displaying the plurality of data such that the portion of the plurality of data associated with the labeling tag is highlighted.

2. The method of claim 1, further comprising parsing the portion of the plurality of data.

3. The method of claim 1, further comprising retrieving the portion of the plurality of data.

4. The method of claim 1, wherein a boundary defining a start and end of the portion of the plurality of data within the plurality of data is embedded into the portion of the plurality of data.

5. The method of claim 1, wherein the request is transmitted to a labeling tag server.

6. The method of claim 1, wherein the URL is received from a labeling tag server.

7. The method of claim 1, wherein the portion of the plurality of data is encapsulated in a microformat.

8. The method of claim 1, wherein the portion of the plurality of data is enclosed between a start tag and an end tag.

9. The method of claim 1, wherein the portion of the plurality of data is located immediately after the position of the anchor definition.

10. A non-transitory computer readable storage medium storing computer instructions executable for:

transmitting a request to obtain a Uniform Resource Locator (URL) associated with a plurality of data, the request comprising a labeling tag associated with the plurality of data;

in response to said request, receiving the URL, wherein the URL comprises an anchor identifier that is separated from a remainder of the URL by a delimiter, and wherein the anchor identifier is usable to point to an anchor definition that is located in the plurality of data, the pointed to anchor definition having a name that matches the anchor identifier;

retrieving the plurality of data located at the URL, the plurality of data comprising an anchor definition embedded at a position within the plurality of data and wherein the name of the anchor definition matches the anchor identifier;

locating the anchor definition within the plurality of data based on the anchor identifier;

locating a portion of the plurality of data based on the position of the anchor definition, the portion of the plurality of data being separate from the anchor definition and encapsulated in a microformat and associated with the labeling tag, wherein the portion of the plurality of data excludes some of the plurality of data;

parsing the portion of the plurality of data to search for an element of the plurality of data;

retrieving the element from the portion of the plurality of data; and displaying the element such that it is highlighted.

11. The non-transitory computer readable storage medium of claim 10, wherein the computer instructions for parsing the portion of the plurality of data comprises computer instructions for parsing from a start of the portion of the plurality of data to an end of the portion of the plurality of data.

12. The non-transitory computer readable storage medium of claim 10, wherein the request is transmitted to a labeling tag server.

13. The non-transitory computer readable storage medium of claim 10, wherein the microformat identifies a start and an end of the portion of the plurality of data.

14. The non-transitory computer readable storage medium of claim 10, wherein the portion of the plurality of data is enclosed between a start tag and an end tag.

15. A system, comprising:

a labeling tag server;

a Web server configured to store a Web page; and a computing device in communication with the labeling tag server and the Web server, the computing device being configured to execute an application, the application comprising computer instructions for:

transmitting a request to the labeling tag server the request comprising a labeling tag, in response to said request, receiving a URL from the labeling tag server, the URL identifying the Web page comprising an anchor identifier that is separated from a remainder of the URL by a delimiter, and wherein the anchor identifier is usable to point to an anchor definition that is located in the Web page, the pointed to anchor definition having a name that matches the anchor identifier, retrieving the Web page from the Web server located at the URL, the Web page being embedded with an anchor definition at a given position, wherein the name of the anchor definition matches the anchor identifier, locating the anchor definition within the Web page based on the anchor identifier, and determining a region of the Web page, wherein said determining is based on the position of the anchor definition, wherein the region of the Web page is separate from the anchor definition, is encapsulated in a microformat and is associated with the labeling tag, wherein the region of the Web page excludes some of the Web page including the anchor;

displaying the Web page, including the region of the Web page, and highlighting the region of the web page.

16. The system of claim 15, wherein the application further comprises computer instructions for, parsing the region to search for an element of the region, and retrieving the element from the region.

17. The system of claim 15, wherein the application further comprises computer instructions for retrieving the region of the Web page.

18. The system of claim 15, wherein the microformat identifies a start and an end of the region of the Web page.

19. The system of claim 15, wherein the region of the Web page is enclosed between a start tag and an end tag.

20. A system, comprising:
a labeling tag server;
a Web server configured to store a plurality of data;
a client computing device that is configured to execute a client application, the client application comprising computer instructions for transmitting a first request to an application server to obtain an element of the plurality of data; and
the application server in communication with the labeling tag server, the Web server, and the client computing device, the application server being configured to execute a server application, the server application comprising computer instructions for,
receiving from the client computing device, the first request to obtain the element;
in response to said receiving, transmitting a second request to the labeling tag server to obtain a Uniform Resource Locator (URL) that identifies a location of the plurality of data, the second request comprising a labeling tag associated with the plurality of data, the element of data being included within a portion of the plurality of data, wherein the portion of the plurality of data is enclosed in a microformat;
in response to the second request, receiving the URL from the labeling tag server, the URL, comprising an anchor identifier that is separated from a remainder of the URL by a delimiter, and wherein the anchor identifier is usable to point to an anchor definition that is located in the plurality of data, the pointed to anchor definition having a name that matches the anchor identifier,
retrieving the plurality of data located at the URL, the plurality of data comprising an anchor definition embedded at a position within the plurality of data, wherein the name of the anchor definition matches the anchor identifier,
locating the anchor definition within the plurality of data based on the anchor identifier,
parsing the portion of the plurality of data located immediately after the anchor definition to search for the element,
retrieving the element from the portion of the plurality of data, wherein the element is associated with the labeling tag, wherein the portion of the plurality of data is separate from the anchor definition and excludes some of the plurality of data; and
sending the element of the plurality of data to the client computing device.

21. The system of claim 20, wherein the portion of the plurality of data is encapsulated in a microformat.

22. A method, comprising:
transmitting a request to obtain a Uniform Resource Locator (URL) identifying a location of a plurality of data, the request comprising a labeling tag associated with the plurality of data;
in response to said request, receiving the URL, the URL comprising an anchor identifier that is separated from a remainder of the URL by a delimiter, and wherein the anchor identifier is usable to point to an anchor definition that is located in the plurality of data, the pointed to anchor definition having a name that matches the anchor identifier;
retrieving the plurality of data located at the URL, the plurality of data comprising an anchor definition embedded at a position in the plurality of data, wherein the name of the anchor definition matches the anchor identifier;
locating the anchor definition within the plurality of data based on the anchor identifier;
locating a portion of the plurality of data based on the position of the anchor definition, wherein the portion is separate from the anchor definition and the portion of the plurality of data is associated with the labeling tag and is enclosed by a microformat that identifies boundaries of the portion of data having a beginning and end within the plurality of data and excluding some of the plurality of data;
parsing the portion of the plurality of data to search for an element of the portion of the plurality of data; and
retrieving the element from the portion of the plurality of data.

* * * * *